(12) United States Patent
Suzuki

(10) Patent No.: US 7,275,099 B2
(45) Date of Patent: Sep. 25, 2007

(54) PRIVATE BRANCH EXCHANGE BACK-UP SYSTEM, BACK-UP DEVICE FOR PRIVATE BRANCH EXCHANGE AND FAILURE COPING METHOD OF NETWORK SYSTEM

(75) Inventor: Yasunori Suzuki, Tokyo (JP)

(73) Assignee: Nec Infrontia Corporation, Kanagawa (JP)

( * ) Notice: Subject to any disclaimer, the term of this patent is extended or adjusted under 35 U.S.C. 154(b) by 476 days.

(21) Appl. No.: 10/866,258

(22) Filed: Jun. 14, 2004

(65) Prior Publication Data
US 2005/0005195 A1 Jan. 6, 2005

(30) Foreign Application Priority Data
Jun. 12, 2003 (JP) ............................. 2003-168380

(51) Int. Cl.
*G06F 15/173* (2006.01)
*G06F 17/30* (2006.01)

(52) U.S. Cl. ...................................... 709/223; 707/202
(58) Field of Classification Search ................ 707/202; 709/223
See application file for complete search history.

(56) References Cited

U.S. PATENT DOCUMENTS

| | | | |
|---|---|---|---|
| 6,202,169 B1* | 3/2001 | Razzaghe-Ashrafi et al. .. | 714/6 |
| 6,356,622 B1 | 3/2002 | Hassell et al. | |
| 6,457,050 B1* | 9/2002 | Cowan et al. ............... | 709/224 |
| 6,748,057 B2* | 6/2004 | Ranalli et al. ............ | 379/88.17 |
| 6,904,142 B1* | 6/2005 | Tanaka ................... | 379/221.04 |
| 7,032,029 B1* | 4/2006 | Tanzman et al. ............. | 709/245 |
| 2003/0079056 A1* | 4/2003 | Taylor ............................ | 710/1 |
| 2003/0200309 A1* | 10/2003 | Ohhashi et al. ............. | 709/224 |
| 2004/0122923 A1* | 6/2004 | Kamenetsky et al. ....... | 709/223 |
| 2004/0213215 A1* | 10/2004 | Kakiuchi ..................... | 370/352 |
| 2005/0080887 A1* | 4/2005 | Lee et al. ................... | 709/223 |
| 2005/0122958 A1* | 6/2005 | Shim et al. .................. | 370/352 |
| 2005/0185637 A1* | 8/2005 | Nakamura .................. | 370/352 |
| 2006/0173988 A1* | 8/2006 | Yamashita .................. | 709/223 |

FOREIGN PATENT DOCUMENTS

JP 63-285053 11/1988

(Continued)

OTHER PUBLICATIONS

Satoshi, Nagashima: Patent Abstract of Japan 07-154429, published Jun. 16, 1995 (from IDS, Applicant provided).*

*Primary Examiner*—John Cottingham
*Assistant Examiner*—Kuen S Lu
(74) *Attorney, Agent, or Firm*—Young & Thompson

(57) ABSTRACT

The back-up device for an IP-PBX of the present invention is connected to each network. The private branch exchange is connected to an individual network to manage and hold the entire terminal device. The back-up device holds each terminal data of a group of terminal devices in a connected network. As a result, when connection management by the private branch exchange develops a failure, the back-up device secures connection management in the network to which the back-up device is connected. When the network or the private branch exchange itself develops a failure to disable control of an accommodated IP terminal, this arrangement enables the IP terminal to resume operation by temporarily shifting control of the IP terminal to the back-up device side, thereby minimizing stop time.

3 Claims, 7 Drawing Sheets

FOREIGN PATENT DOCUMENTS

| | | |
|---|---|---|
| JP | 7-154429 | 6/1995 |
| JP | 2002-16697 | 1/2002 |
| JP | 2003-258843 | 9/2003 |
| JP | 2003-259000 | 9/2003 |
| JP | 2003-284107 | 10/2003 |
| JP | 2004-134878 | 4/2004 |

\* cited by examiner

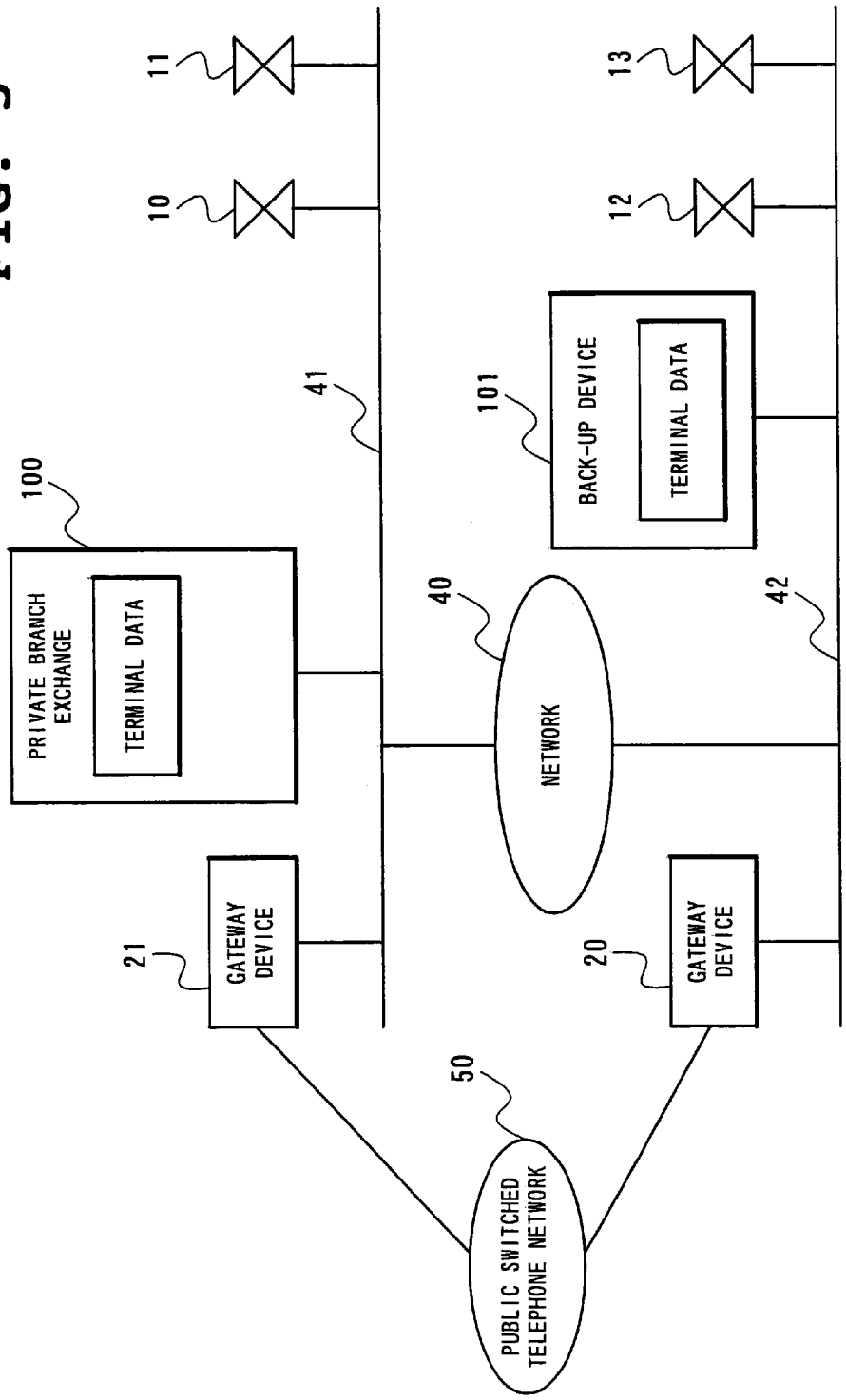

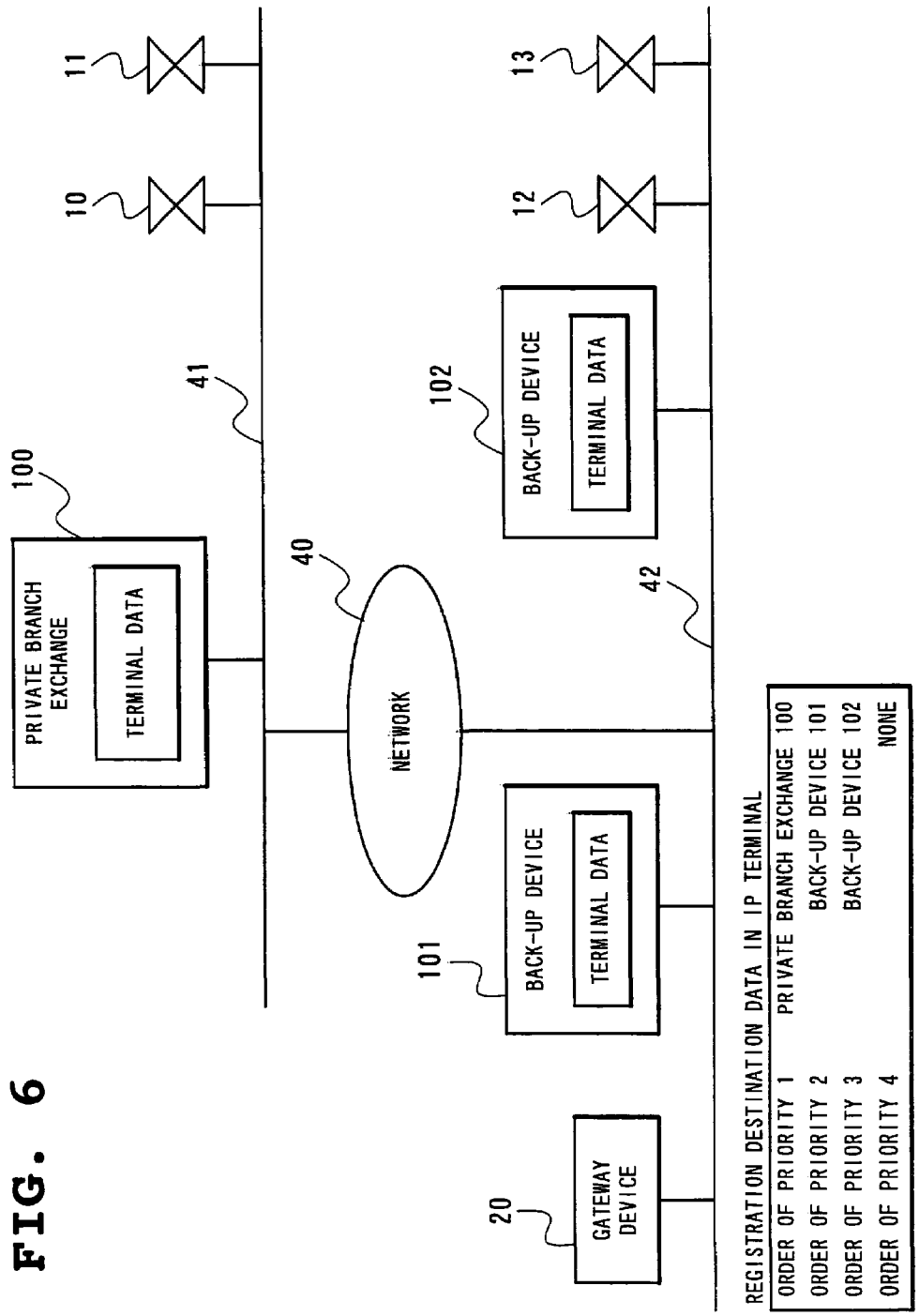

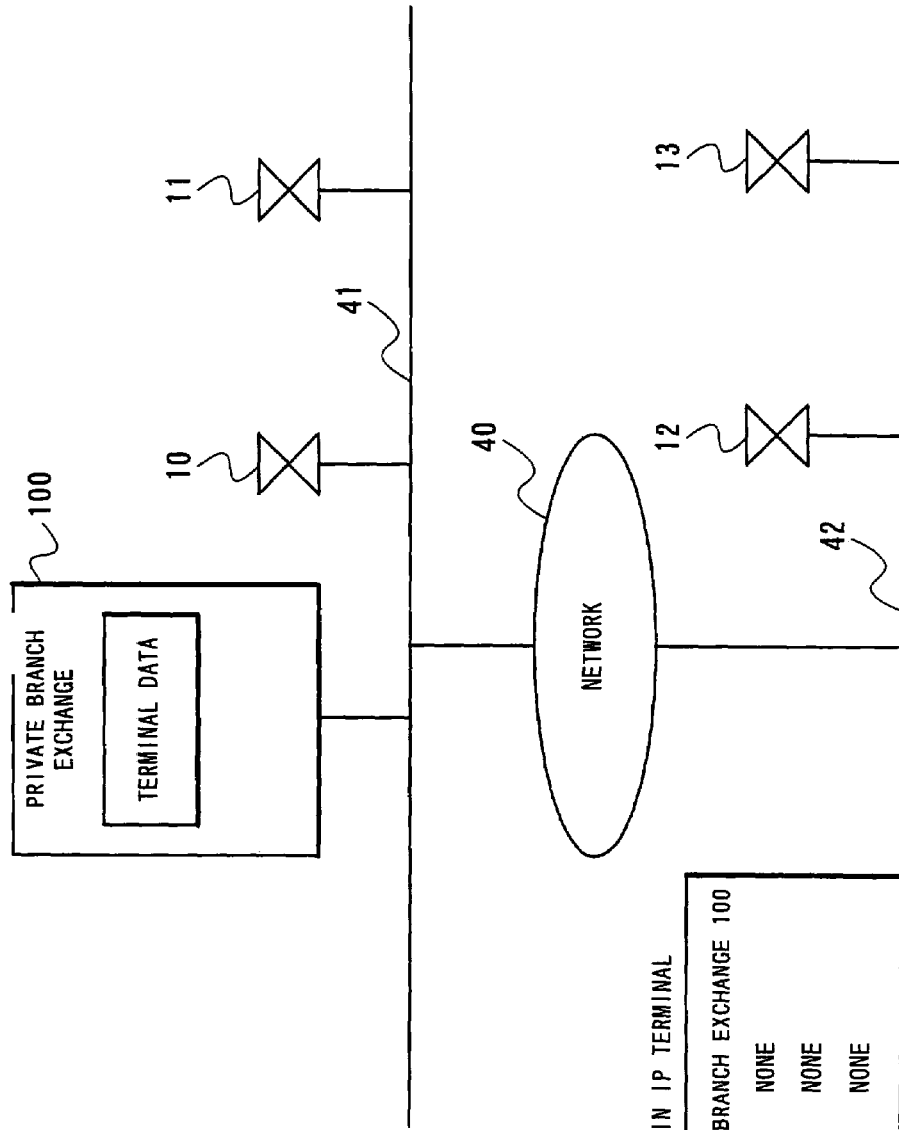

PRIVATE BRANCH EXCHANGE BACK-UP SYSTEM, BACK-UP DEVICE FOR PRIVATE BRANCH EXCHANGE AND FAILURE COPING METHOD OF NETWORK SYSTEM

BACKGROUND OF THE INVENTION

1. Field of the Invention

The present invention relates to a back-up device for an IP-PBX (Internet Protocol-Private Branch Exchange) targeting a failure of an IP-PBX, an IP-PBX back-up system and a failure coping method of a system.

2. Description of the Related Art

Conventional back-up device for IP-PBX is in general equipped with a back-up device for the purpose of coping with physically different networks. Such a conventional IP-PBX system as shown in FIG. 7, for example, includes physically different networks 41 and 42, a network 40 connecting the networks, an IP-PBX device (hereinafter referred to as a private branch exchange or a private branch exchange 100) and IP terminals 10 and 11 connected to the network 41, and IP terminals 12 and 13 connected to the network 42 (see e.g. Japanese Patent Laying-Open (Kokai) No. Showa 63-285053 which will be referred to as Literature 1 hereinafter).

Thus structured conventional IP-PBX system operates in the following manner.

The IP terminals 12 and 13 connected to the network 42 transmit a terminal operation start request to the private branch exchange 100 through the network 40, and the private branch exchange 100 searches stored terminal data for a terminal whose registration is requested and when such a terminal exists in the data, puts the relevant IP terminal under the control of the private branch exchange 100, whereby thereafter a transmission request from the IP terminal and an arrival instruction from other IP terminal are all transmitted to the IP terminals through the networks 40 and 42 according to the private branch exchange 100.

In other words, the IP-PBX device itself and the IP terminal are connected by a network communicable by using a TCP/IP (Transport Control Protocol/Internet Protocol) such as a LAN (Local Area Network) or the Internet. This enables an IP terminal disposed at a place physically and geographically apart to be controlled only by a central IP-PBX (private branch exchange) without disposing an IP-PBX at the site in question.

In the above-described Literature 1, a network management interface for the switching between a main unit and a spare unit exists within a communication network. Switching between the main unit and the spare unit is conducted by the network management interface.

On the other hand, in Japanese Patent Laying-Open (Kokai) No. Heisei 7-154429 (hereinafter referred to as Literature 2), when a first IP (Internet Protocol) router develops a failure, a second IP router takes over a MAC (Media Access Control) address and an IP address of an IP router at an address indicated by a node of the first IP router. According to the technique, with a LAN-WAN-LAN (Local Area Network-Wide Area Network-Local Area Network) connected IP router duplexed, a secondary IP router monitors a state of a primary IP router and when the primary IP router develops a failure, the secondary IP router takes over information and an address of the primary IP router to realize automatic duplexing of the IP routers and compensate for communication between terminals.

The above-described conventional art have the following shortcomings.

The first problem is that a failure occurring in a network such as a LAN or the Internet makes control of an IP terminal completely impossible to prevent continuation of normal operation of the IP terminal. In particular, crucial is that not only a physical cable failure but also a software failure of a router might be a cause of impossible control.

The reason is that in a case where a control signal for controlling an IP terminal is transmitted as a packet by a TCP/IP protocol and a communication path of the packet develops a failure, when the packet fails to reach an IP-PBX or the IP terminal, the control signal for controlling the terminal arrives neither. As a result, control of the IP terminal is disabled.

In particular, when using a network to which unspecified numbers of apparatuses and networks are connected such as the Internet, reliability of each network can not be secured for sure. Therefore, a possibility that normal operation will continue will be reduced.

In the above-described Literature 2, at the time of a failure, the back-up device takes over an IP address and a MAC address of the main device and completely replaces the main device to operate. Therefore, when a communication path to the device is cut off, there will remain no detouring method.

SUMMARY OF THE INVENTION

An object of the present invention is to provide a back-up device for an IP-PBX having improved operation reliability, an IP-PBX back-up system and a failure coping method of a network system.

More specifically, the present invention provides a back-up device for an IP-PBX, an IP-PBX back-up system and a failure coping method of the system which, under the environment where an IP-PBX (hereinafter referred to as a private branch exchange) is used, when a local area network to which an IP extension multifunctional telephone (hereinafter referred to as an IP terminal) is connected, or an IP network (hereinafter referred to as a network) such as the Internet, or the private branch exchange itself develops a failure to disable control of the accommodated IP terminal, minimize stop time by temporarily shifting control of the IP terminal to the back-up device side to enable the IP terminal to resume operation.

According to the first aspect of the invention, a private branch exchange back-up system in a network system, comprises a plurality of networks to which at least one terminal device is connected, a network for relay which connects the plurality of networks, a private branch exchange which is connected to any one of the plurality of networks and which holds terminal data for managing connection between the terminal devices connected to the plurality of networks, and a back-up device which is connected to at least one of the plurality of networks and which holds each terminal data of the terminal device in the connected network, wherein the back-up device serves, as a substitute, to manage connection between the terminal devices in the connected network.

In the preferred construction, the plurality of networks include a first network to which the terminal device is connected and a second network to which the terminal device is connected, the private branch exchange is connected to either the first network or the second network, and the back-up device is connected to either the first network or the second network.

In another preferred construction, the back-up device is provided in each of the plurality of networks and when the private branch exchange and/or the network for relay develops a failure, the back-up device serves, as a substitute, to manage connection between the terminal devices in the network.

In another preferred construction, immediately after power application, the back-up device inquires about terminal data of the terminal device in the network under the control of the private branch exchange to download the terminal data held in the private branch exchange.

In another preferred construction, the back-up device inquires of the private branch exchange about terminal data at predetermined time intervals set in advance to download the terminal data as of the inquiry which is held in the private branch exchange.

In another preferred construction, the back-up device is provided, out of the networks, in the network in which a gateway device as a connection part with a public switched telephone network is disposed.

In another preferred construction, the back-up device is provided in the plural on the network.

In another preferred construction, the back-up device transmits a state monitoring signal to the private branch exchange at predetermined time intervals, and according to existence/non-existence of a response to the state monitoring signal, detects occurrence of a failure in the private branch exchange and/or the network for relay to enter a mode of managing connection between the terminal devices.

According to another aspect of the invention, a back-up device for a private branch exchange in a network system in which a plurality of networks to which at least one terminal is connected are connected by another network for relay and a private branch exchange is connected to any one of the plurality of networks, which is connected to at least one of the plurality of networks, and downloads and holds terminal data for managing connection between the terminal devices which is held in the private branch exchange to serve by inquiring of the private branch exchange, as a substitute, to manage connection between the terminal devices in the network connected.

In the preferred construction, the back-up device for a private branch exchange, which immediately after power application, inquires about terminal data of the terminal device in the network under the control of the private branch exchange to download the terminal data held in the private branch exchange.

In another preferred construction, the back-up device for a private branch exchange, which inquires of the private branch exchange about terminal data at predetermined time intervals set in advance to download the terminal data as of the inquiry which is held in the private branch exchange.

In another preferred construction, the back-up device for a private branch exchange, which transmits a state monitoring signal to the private branch exchange at predetermined time intervals, and according to existence/non-existence of a response to the state monitoring signal, detects occurrence of a failure in the private branch exchange and/or the network for relay to enter a mode of managing connection between the terminal devices.

According to another aspect of the invention, a failure coping method of a network system structured to have a plurality of networks to which at least one terminal is connected by another network for relay and have a private branch exchange connected to any one of the plurality of networks, comprising the steps of connecting a back-up device for the private branch exchange to at least one of the plurality of networks, downloading terminal data for managing connection between the terminal devices which is held in the private branch exchange and holding the data in the back-up device, and when a failure occurs in the operation of connecting the respective terminal devices conducted by the private branch exchange, executing management of connection between the terminal devices in the network by the back-up device in place of the private branch exchange.

In the preferred construction, the failure coping method of a network system, comprising the step of transmitting a state monitoring signal from the back-up device to the private branch exchange at predetermined time intervals, and according to existence/non-existence of a response to the state monitoring signal, detecting occurrence of a failure in the private branch exchange and/or the network for relay to put the back-up device into a mode of managing connection between the terminal devices.

Other objects, features and advantages of the present invention will become clear from the detailed description given herebelow.

BRIEF DESCRIPTION OF THE DRAWINGS

The present invention will be understood more fully from the detailed description given herebelow and from the accompanying drawings of the preferred embodiment of the invention, which, however, should not be taken to be limitative to the invention, but are for explanation and understanding only.

In the drawings:

FIG. 5 is a diagram of a network structure showing a third embodiment;

FIG. 6 is a diagram of a network structure showing a fourth embodiment; and

FIG. 7 is a diagram showing an example of a structure of a conventional IP-PBX system.

DESCRIPTION OF THE PREFERRED EMBODIMENT

The preferred embodiment of the present invention will be discussed hereinafter in detail with reference to the accompanying drawings. In the following description, numerous specific details are set forth in order to provide a thorough understanding of the present invention. It will be obvious, however, to those skilled in the art that the present invention may be practiced without these specific details. In other instance, well-known structures are not shown in detail in order to unnecessary obscure the present invention.

Next, embodiments of a private branch exchange back-up system according to the present invention will be described in detail with reference to the drawings. FIGS. 1 to 6 show one embodiment of a private branch exchange back-up system and a back-up device according to the present invention.

Figure 1:
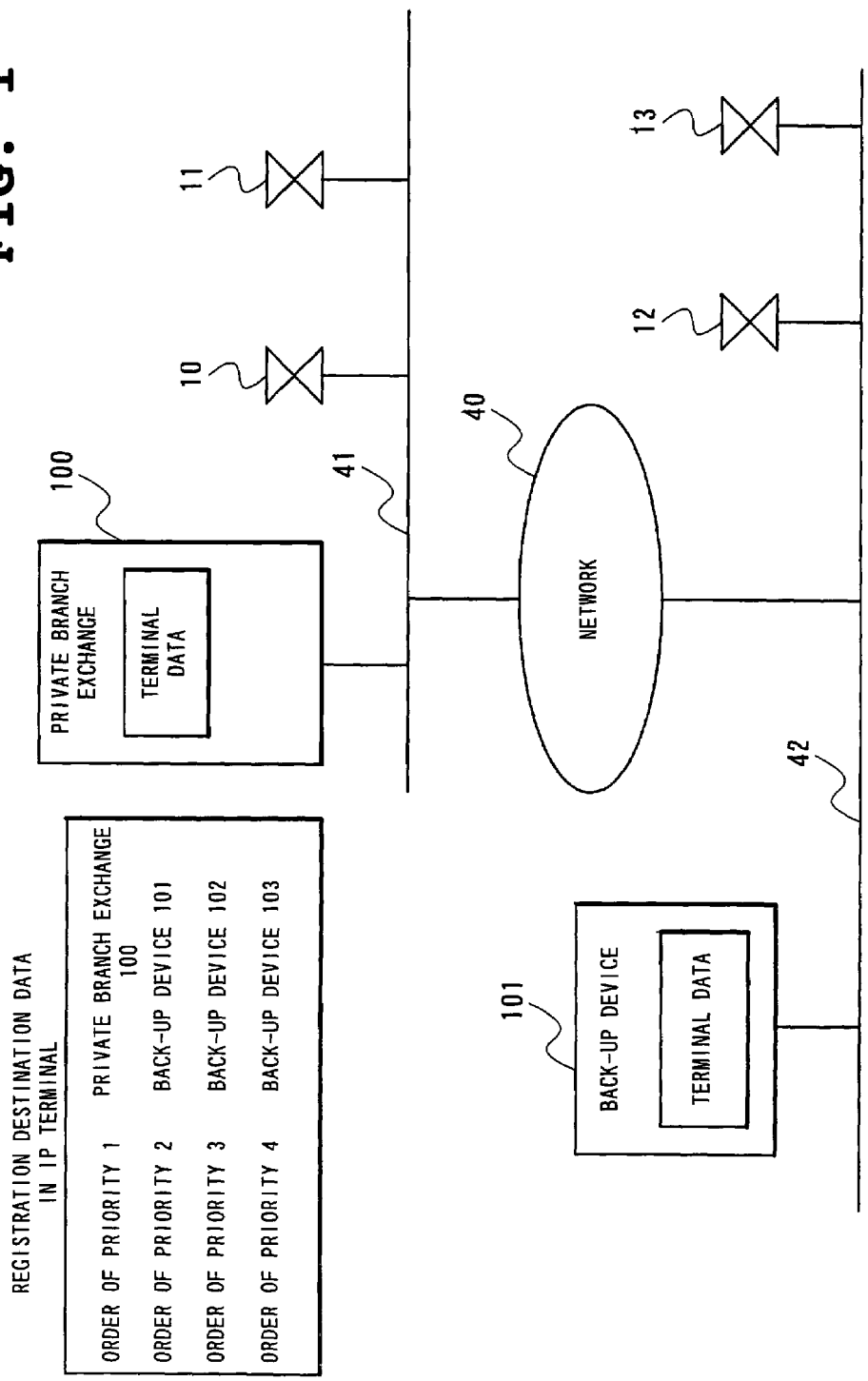
FIG. 1 is a diagram of a network structure showing a first embodiment of a private branch exchange back-up system according to the present invention.

As shown in FIG. 1, IP terminals 10 and 11 and IP terminals 12 and 13 belong to a network 41 and a network 42, respectively. The networks 41 and 42 are connected to each other through a network 40 and controlled by a control signal from a private branch exchange 100. A back-up device 101, after activation of the device, inquires of the private branch exchange 100 to download a copy of terminal data held in the private branch exchange 100 and holds the same in the back-up device 101.

When the IP terminal 12 calls up the IP terminal 13, the terminal 12 ordinarily transmits a call transmission request signal to the private branch exchange 100 through the network 40 and the private branch exchange 100 specifies an IP terminal as a call arrival destination to transmit a communication path setting signal to the IP terminal 13 so as to establish communication with the IP terminal 12.

The IP terminal 13 having received the communication path setting signal sets up a communication path with the IP terminal 12 and follows a communication starting procedure to enable telephonic communication between the IP terminal 12 and the IP terminal 13. A series of operation is similarly conducted in telephonic communication between the IP terminal 10 and the IP terminal 12. Thus, for establishing telephonic communication between IP terminals, control by the private branch exchange 100 is required.

Here, when some failure occurs in the network 40 to disable execution of communication between the networks 41 and 42, transmission of a call transmission request signal for calling up the IP terminal 13 from the IP terminal 12 is disabled, resulting in disabling telephonic communication with the IP terminal 13 from being established. In addition, because reception of a control signal from the private branch exchange 100 is also disabled, all the operation as a terminal is disabled-until the failure of the network 40 is recovered.

Here, the back-up device 101 detects communication with the private branch exchange 100 being disabled and changes an operation mode of the back-up device 101 itself to accept a terminal operation start request from the IP terminal, while the IP terminals 12 and 13 detect transmission and reception of a control signal to/from the private branch exchange 100 being disabled and transmit a terminal operation start request to the back-up device 101 from a plurality of registration destinations registered in the terminal to go under the control of the back-up device 101. This makes the IP terminals 12 and 13 resume their operation to enable telephonic communication with other IP terminal.

Thereafter, at a time point where the failure of the network 40 is recovered to restore communication between the back-up device 101 and the private branch exchange 100, the back-up device 101 instructs the IP terminals 12 and 13 to come out of the control. As a result, the IP terminal again transmits a terminal operation start request in the order of priorities to again go under the control of the private branch exchange 100, so that it can be returned to the operation state.

Thus, under the environment where IP terminals distributed among physically different networks are concentratively controlled by a single private branch exchange, the IP terminal stop at the time of a network failure can be recovered without manual switching of a device or network restoration work.

In the following, structure of the embodiment will de detailed.

Structure of Embodiments

Figure 2:
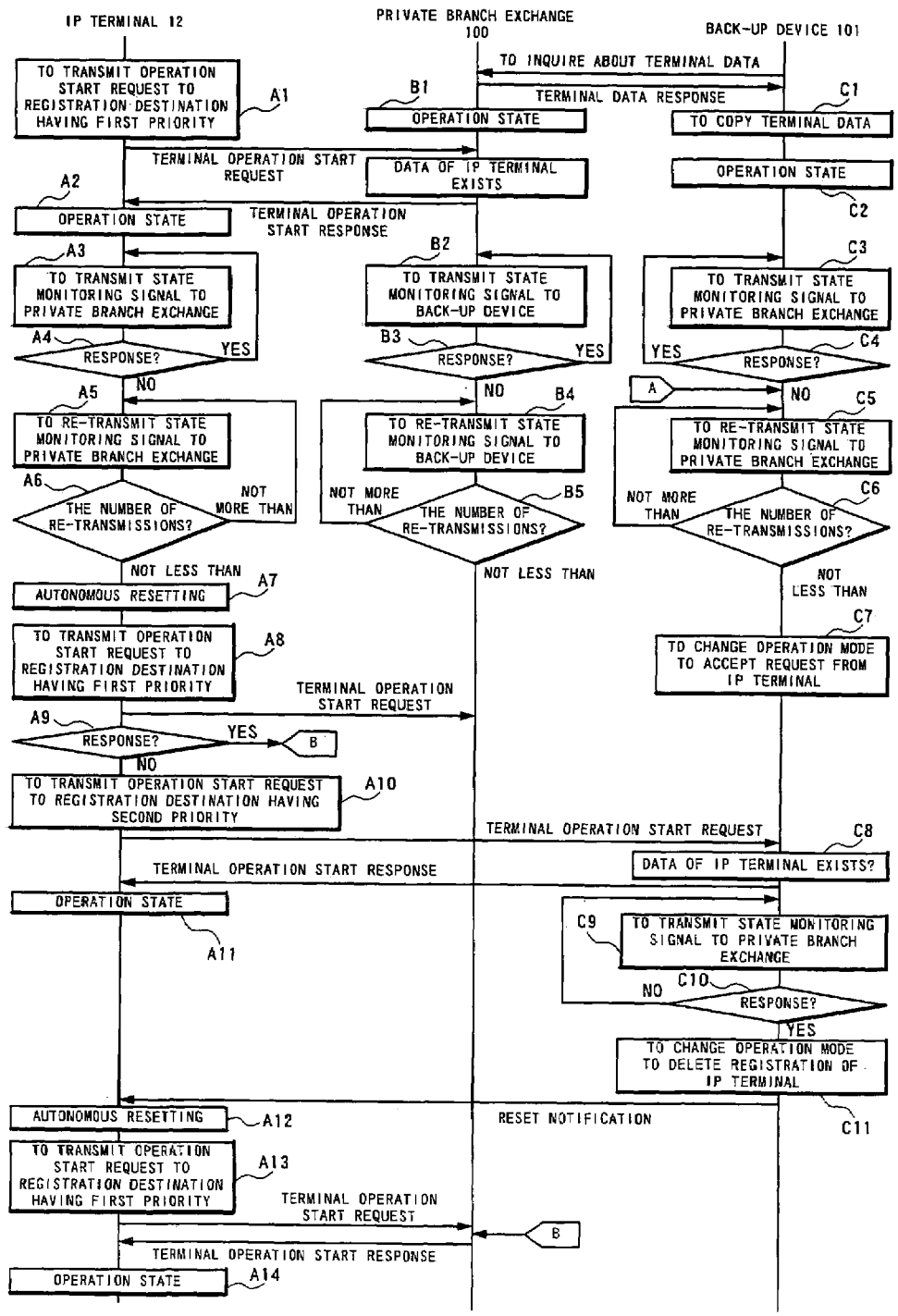
FIG. 2 is a flow chart showing an example of operation according to the first embodiment.

FIG. 1 is a diagram of a network structure showing a first embodiment of the private branch exchange back-up system according to the present invention. FIG. 2 is a flow chart for use in explaining operation.

With reference to FIG. 1, one embodiment of the private branch exchange back-up system and the back-up device according to the present invention include the physically different networks 41 and 42 and the network 40 which connect these networks. Connected to the network 41 are the private branch exchange 100 and the IP terminals 10 and 11 and connected to the network 42 are the back-up device 101 and the IP terminals 12 and 13.

The IP terminals 10, 11, 12 and 13 store a plurality of registration destinations of terminal information and try registration of terminal information in the descending order of priorities. In this example, first try to register terminal information at the private branch exchange 100. The private branch exchange 100 has terminal data of the IP terminals 10, 11, 12 and 13 stored in the internal storage device, and the IP terminals 10, 11, 12 and 13 ordinarily operate under the control of the private branch exchange 100.

Control signal between the IP terminals 10 and 11 and the private branch exchange 100 is transmitted and received through the network 41. Control signal between the IP terminals 12 and 13 and the private branch exchange 100 is transmitted and received through the networks 42 and 40.

The back-up device 101, which has a function of controlling connection between IP terminals functionally equivalent to the private branch exchange 100 and holds an IP address of a device (the private branch exchange 100) to be backed up, inquires of the target device (the private branch exchange 100 in this case) about terminal data immediately after power application and downloads and holds a copy of terminal data of the private branch exchange 100 as of that time.

Inquiring the private branch exchange 100 about terminal data may be made not only immediately after power application but also at predetermined time intervals set in advance thereafter.

The IP terminals 10, 11, 12 and 13 and the back-up device 101 transmit and receive a state monitoring signal to/from the private branch exchange 100 through the networks 41, 42 and 40 in an arbitrarily fixed cycle. The back-up device 101 stores terminal data whose contents are the same as those of the private branch exchange 100. While the state monitoring signal is normally transmitted and received, the back-up device 101 conducts no processing with respect to the IP terminals 12 and 13. Similarly, the device conducts no processing also with respect to the IP terminals 10 and 11 connected to another network 41.

At an ordinary state, the IP terminals 10, 11, 12 and 13 are under the control of the private branch exchange 100 and the IP terminals 10 and 11, and the IP terminals 12 and 13 transmit and receive a control signal to/from the private branch exchange 100 through the network 41, and the networks 40 and 42, respectively.

Description of Operation

Next, detailed description will be made of entire operation of the present embodiment with reference to FIG. 1 and the flow chart shown in FIG. 2.

The back-up device 101 inquires of the private branch exchange 100 about terminal data transmission at a stage where the device is activated and copies the terminal data from the private branch exchange 100 to store the data on the back-up device side (Step C1 in FIG. 2). The IP terminals 10, 11, 12 and 13 (hereinafter note only the IP terminal 12) transmit an operation start request from an internally stored registration destination memory in the descending order of priorities to try terminal operation start registration (Step A1).

First, transmit a terminal operation start request to the private branch exchange 100, so that the private branch exchange 100, which is capable of confirming that data of the IP terminal 12 exists in the internally stored terminal data, returns a terminal operation start response to the IP terminal 12 and the IP terminal 12 having received the response enters an operation state (Step A2).

The IP terminal 12 transmits and receives a state monitoring signal to/from the private branch exchange 100 after entering the operation state until it comes out of the control of the private branch exchange 100 (Step A3). Also the private branch exchange 100 and the back-up device 101 transmit and receive a state monitoring signal for identifying their states with each other all the time. State monitoring signal transmission and reception interval of each device can be arbitrarily set (Step C3).

Upon transmitting a state monitoring signal, the IP terminal 12 and the back-up device 101 confirm whether the state monitoring signal is received from the private branch exchange 100 (Steps A4 and C4). When communication has nothing wrong, again transmit and receive a state monitoring signal after an arbitrarily set transmission/reception interval (Steps A4, C4/YES).

Consideration will be given here to a case where some failure occurs in the network 40 to disable signal transmission and reception through the network 40.

At a time point where a failure occurs in the network 40, the back-up device 101 fails in transmission/reception of the state monitoring signal to/from the private branch exchange 100 (Step C4/No). Because there is a possibility of the state monitoring signal disappearing on the network 40 for some reason or another, the back-up device 101 repeats signal transmission/reception a number of times set in advance (Steps C5, C6). As a result, when transmission/reception fails, the back-up device 101 determines that the network 40 develops a failure and changes its own operation state to a state of accepting a terminal operation start request from the IP terminal (Step C7).

At a time when a failure occurs in the network 40, the IP terminal 12 fails in transmission/reception of a state monitoring signal or a control signal to/from the private branch exchange 100 (Steps A5, A6). At this time, the IP terminal 12 tries another transmission/reception of a control signal for a period of time and number of times set in advance and when no response is received within the set time or no response is received within the set number of times, initializes the state of its own terminal by autonomous resetting to come out of the control of the private branch exchange 100. Thereafter, no transmission/reception of a control signal will be conducted (Step A7).

Next, in order to again register its own terminal information, the IP terminal 12 transmits a terminal operation start request to a plurality of internally stored registration destinations in the descending order of priorities. First, while the terminal transmits the request to the private branch exchange 100 whose priority is the highest (Step A8), it obtains no response from the private branch exchange 100 due to a failure of the network 40 (Step A9) and transmits the request to the back-up device 101 having the subsequent priority in the order (Step A10).

The back-up device 101 receives registration information from the IP terminal 12 and conducts reading to find whether the registration information in question exists in its owned terminal data and when determining that the terminal in question exists in the terminal data, transmits a terminal operation start response signal to the IP terminal (Step C8). In response to the terminal operation start response signal, the IP terminal 12 goes under the control of the back-up device 101 and thereafter enters the operation state (Step A11).

Even after changing the operation mode, the back-up device 101 continues transmitting a state monitoring signal toward the private branch exchange 100 (Step C9). At a time point where the failure of the network 40 is recovered to receive a response to the state monitoring signal from the private branch exchange 100 (Step C10/YES), return the right to control the IP terminal which resides on the back-up device 101 side to the private branch exchange 100 side, as well as transmitting a state initialization signal to the IP terminals 12 and 13 under the control so as to come out of the control of the back-up device 101 (Step C11).

The IP terminal 12 having received the signal initializes the state of its own terminal (Step A12) and again transmits registration information to a registration destination in the descending order of priorities. In a case where the telephonic communication with the IP terminal 12 is established under the control of the back-up device 101, give preference to keeping telephonic communication with the IP terminal 12 and transmit a state initialization signal from the back-up device 101 upon completion of the telephonic communication.

Communication with the private branch exchange 100 has no problem because the network 40 is recovered. Therefore, a terminal operation start request signal is transmitted to the private branch exchange 100 having the first priority (Step A13) and the private branch exchange 100 having received the signal conducts read to find whether the IP terminal 12 exists in the terminal data. When determining that the private branch exchange 100 is to be controlled, transmit a terminal operation start response signal to the IP terminal 12. This puts the IP terminal 12 again under the control of the private branch exchange 100 to enter the operation state (Step A14). After all the IP terminals come out of the control, the back-up device 101 again transmits and receives a state monitoring signal to/from the private branch exchange 100.

Figure 3:
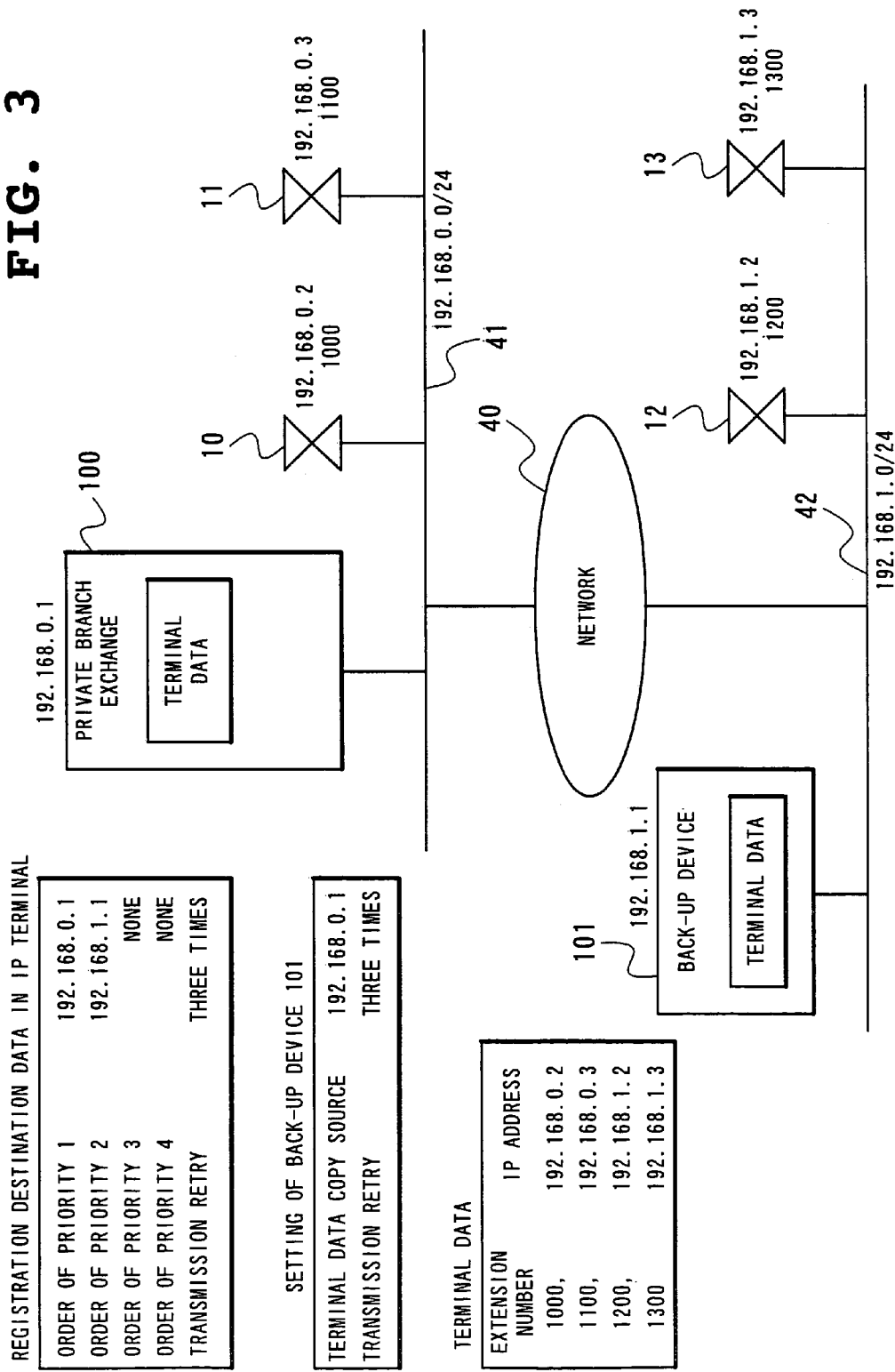
FIG. 3 is a diagram of a network structure showing an application example 1.

Next, description will be made with respect to a specific example. FIG. 3 is a diagram of a network structure showing a first example of application.

As shown in FIG. 3, assume that to the private branch exchange 100, an IP address 192.168.0.1 is assigned and to the back-up device 101, an IP address 192.168.1.1 is assigned.

Registered as registration destinations in the IP terminals 10, 11, 12 and 13 are the IP address of the private branch exchange 100 at the first priority and the IP address of the back-up device 101 at the second priority. With the IP address 192.168.0.1 registered as a terminal data reference destination in the back-up device 101, the back-up device 101 accesses the private branch exchange 100 to copy the terminal data immediately after activation to enter the operation state (Step C1).

The IP terminals 10, 11, 12 and 13 transmit a terminal operation start request signal to the first priority 192.168.0.1, that is, the private branch exchange 100. The private branch exchange 100 refers to its owned terminal data and refers to a transmission source IP address and an extension number set in the terminal operation start request signal to return an operation start response signal to each IP terminal and put the terminals under the control of the private branch exchange 100 as extension numbers 1000, 1100, 1200 and 1300, respectively (Steps A1~A2).

(In the Following, Note the IP Terminal 12)

The IP terminal 12 transmits a state monitoring signal to the private branch exchange 100 to check a response all the time (Step A3). Similarly, the back-up device 101 transmits a state monitoring signal to the private branch exchange 100 to check a response (Step C3). Here, when the network 40 develops a failure to prevent a state monitoring signal from reaching from the back-up device 101 toward 192.168.0.1, that is, the private branch exchange 100, the back-up device 101 conducts re-transmission of the state monitoring signal three times at the most to the private branch exchange 100 ("not more than" at Step C6).

When the network 40 fails to recover to determine that no response is made in the three times of re-transmission, the back-up device 101 changes the operation mode to be able to accept a terminal operation start request from the IP terminal (Step C7). The IP terminals 12 and 13 similarly re-transmit the state monitoring signal to the private branch exchange 100 three times at the most and when determining that no response is received in the three times of re-transmission, conduct autonomous resetting to start the terminal operation start request ("not less than" at Step A6 to Step A7).

Although the IP terminal 12 first transmits the terminal operation start request to 192.168.0.1 having the highest priority, that is, the private branch exchange 100, the signal fails to reach the private branch exchange 100 because the network 40 is yet to recover (Step A8).

The IP terminal 12 determining that no response is made to the terminal operation start request ("no" at Step A9) transmits a terminal operation start request signal to 192.168.1.1 having the second priority, that is, the back-up device 101 (Step A10).

Since the back-up device has already changed the operation mode so as to accept the terminal operation start request of the IP terminal, it accepts the terminal operation start request from the IP terminal 12 to compare the same with the IP address registered as the terminal data and when the address is registered as the data, returns an operation start response to the IP terminal 12 (Step C8).

The IP terminal 12 recovers to the operation state upon receiving the operation start response from the back-up device 101 (Step A11).

Effects of Embodiment

First effect is that IP terminal operation can be automatically recovered when a network failure occurs.

The reason is that detection of a failure of a private branch exchange or a network is actively conducted by transmission/reception of a state monitoring signal and when as a result, recognizing that a failure occurs, its own operation mode is changed to be able to accept a terminal operation start request from the IP terminal.

In addition, since the back-up device downloads the terminal data from the private branch exchange to operate, even when a new terminal is added to the private branch exchange, no data needs to be added to the back-up device side. When normal execution of transmission/reception of a state monitoring signal is restored, determination can be made that a failure is recovered to enable automatic return of the control of the IP terminal to the private branch exchange.

Second effect is that because of the first effect, a time period of operation stop of the IP terminal can be minimized.

The reason is that because a time for detecting a failure of the private branch exchange or the network can be arbitrarily set, time from detection of a failure to switch of the control of the IP terminal to the back-up device can be reduced. Furthermore, because control of the IP terminal can be automatically switched, conventional manual recovery work is unnecessary to drastically reduce time before recovery is completed.

Third effect is that a redundant structure of the back-up device can be taken with ease.

A plurality of registration destinations can be set at the IP terminal with their priorities assigned. The back-up device conducts no control of its own terminal unless a request from a terminal is made. Therefore, control between the back-up devices is simple. Moreover, necessary data setting of the back-up device mainly includes setting of its own IP address required at the time of activation and an IP address of a copy source device of terminal data, used as which terminal data is a copy of terminal data of the private branch exchange. As a result, less steps are required for operating the back-up device.

Second Embodiment

Next, another embodiment of the present invention will be described in detail with reference to the drawings.

Figure 4:
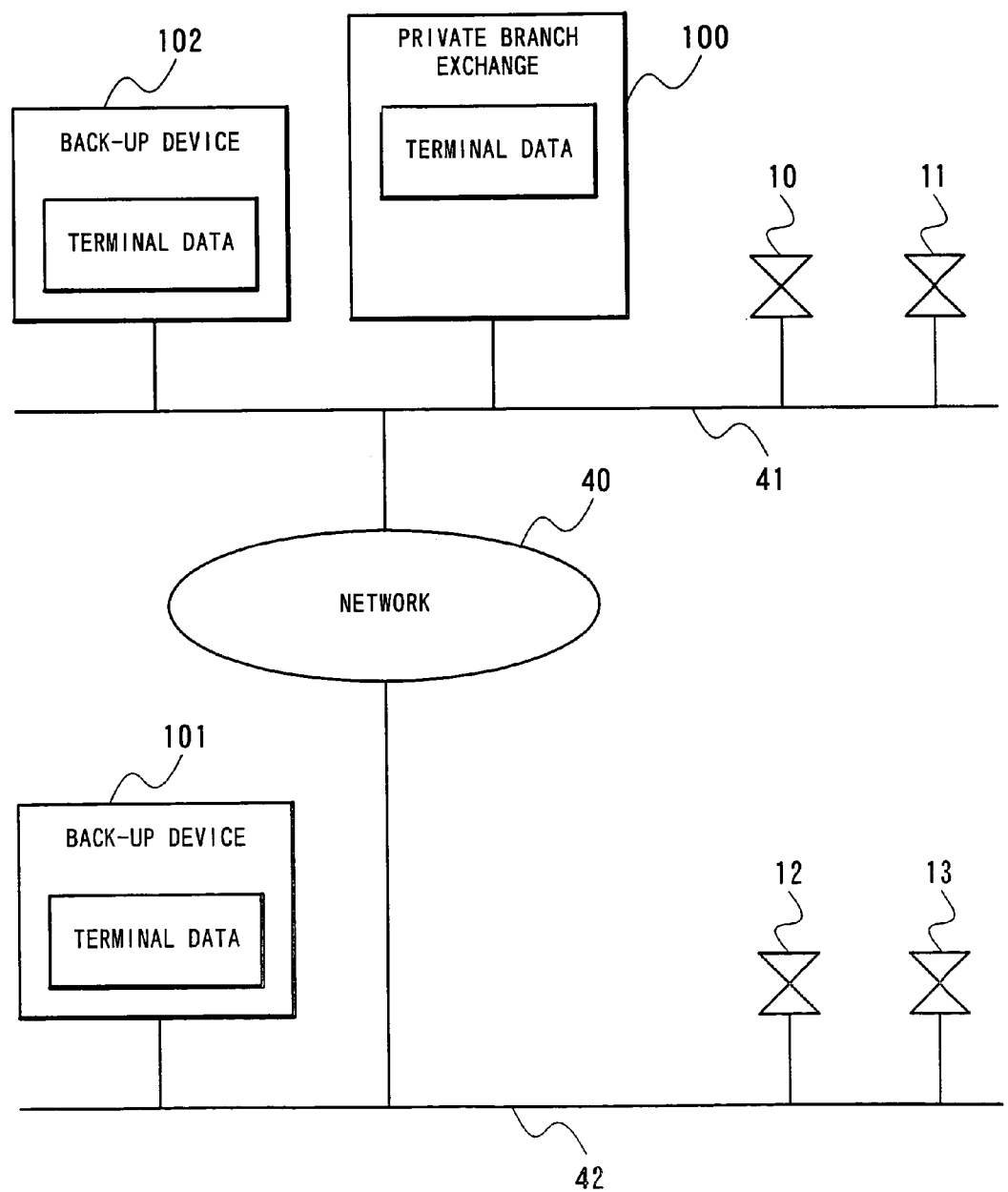
FIG. 4 is a diagram of a network structure showing a second embodiment.

FIG. 4 is a diagram showing a network structure according to a second embodiment. With reference to FIG. 4, the present embodiment includes a private branch exchange 100, a back-up device 102 and IP terminals 10 and 11 connected to a network 41, the same network to which the private branch exchange 100 connects, a physically different network 42, and a back-up device 101 and IP terminals 12 and 13 connected to the network 42.

In the structure example shown in FIG. 1, when the private branch exchange 100 itself develops a failure, the IP terminals 12 and 13 go under the control of the back-up device 101 to continue operation. As to the IP terminals 10 and 11, however, no device for controlling the same exists, so that until the failure of the private branch exchange 100 is recovered, they are not allowed to operate. With the structure shown in FIG. 4, when the private branch exchange 100 develops a failure, the back-up device 102 controls the IP terminals 10 and 11 to enable the IP terminals 10 and 11 to resume operation.

More specifically, assume that all the IP terminals store registration destination data having such order of priorities as shown in FIG. 4. At this state, when the private branch exchange 100 develops a failure, because transmission/reception of a state monitoring signal between the back-up device 102 and the private branch exchange 100 fails, the back-up device 102 changes its own operation mode so as to accept terminal operation start registration from the IP terminal. The IP terminals 10 and 11 similarly fail in transmission/reception of a state monitoring signal to/from the private branch exchange 100, so that after trying re-transmission several times, the terminals conduct autonomous resetting to try re-registration to the plurality of registration destinations in the order of priorities.

Although with respect to the private branch exchange 100 having the highest priority, registration fails because the private branch exchange 100 itself develops a failure, registration is possible to the back-up device 102 registered at the second priority. Therefore, the IP terminals 10 and 11 are allowed to operate. Similarly, the IP terminals 12 and 13 are naturally allowed to resume operation by making registration to the back-up device 101. Furthermore, the order of priorities of the registration destinations which the IP terminals 10 and 11 and the IP terminals 12 and 13 have can be individually registered. Therefore, by setting the priority of a back-up device existing in the same network to be subsequent to that of the private branch exchange 100, time before operation resumes can be reduced.

Third Embodiment

Next, third embodiment of the present invention will be described in detail with reference to the drawings.

With reference to FIG. 5, the present embodiment includes, in addition to the components in the structure example shown in FIG. 1, gateway devices 20 and 21 connected as connection units from an IP network to a public switched telephone network. The gateway devices 20 and 21, similarly to the IP terminals 12 and 13, ordinarily transmit and receive a terminal operation start request to/from the private branch exchange 100 to conduct arrival call processing between the IP network and the public switched telephone network under the control of the private branch exchange 100.

When transmission/reception of a state monitoring signal is cut off between the private branch exchange 100 and the back-up device 101, the back-up device 101 changes an operation mode of its own device to accept a terminal operation start request from the IP terminals 12 and 13. The device also accepts a terminal operation start request from the gateway device 20 to put the IP terminals 12 and 13 and the gateway device 20 under the control of the back-up device 101.

At this state, without waiting for the network 40 to recover, telephonic communication between the network 42 under the control of the back-up device 101 and the network 41 under the control of the private branch exchange 100 or the back-up device 102 is allowed between the IP terminals 10 and 11 and the IP terminals 12 and 13 through the gateway devices 20 and 21.

More specifically, assume that an extension number of the IP terminal 10 is 1000, that of the IP terminal 11 is 1100, that of the IP terminal 12 is 1200 and that of the IP terminal 13 is 1300, and an outside line number of the gateway device 20 is 20-1111 and that of the gateway device 21 is 21-1111. When the network 40 is normally operated, all of the IP terminals 10, 11, 12 and 13 and the gateway devices 20 and 21 are put under the private branch exchange 100. When the IP terminal 12 dials the extension number 1000 for calling up the IP terminal 10, a communication path is established between the IP terminal 12 and the IP terminal 10 through the network 40 to make a call.

Here, when the network 40 develops a failure to make transmission/reception of a state monitoring signal between the private branch exchange 100 and the back-up device 101 impossible, the IP terminal 12 is put under the control of the back-up device 101. Similarly, the gateway device 20 is also put under the control of the back-up device 11. The IP terminals 10 and 11 and the gateway device 21 remain under the control of the private branch exchange 100. Here, the back-up device 101 notifies the IP terminals 12 and 13 that they are placed under the control of the back-up device 101. For this purpose, give an instruction on displaying on the terminal or lighting of a button. Under such conditions, for the IP terminal 13 to call up the IP terminal 11, first dial the outside line number 21-1111, so that a call arrives at the gateway device 21.

The gateway device transmits an identification sound such as a dial tone to the IP terminal 13 to urge to dial an extension number to be connected. When ultimately dialing the outside line number 1100 for calling up the IP terminal 11, the IP terminal 13 is subjected to the control by the private branch exchange 100 to establish a telephonic communication path between the IP terminal 12 and the IP terminal 11 through the gateway device 21 to enable telephonic communication.

Fourth Embodiment

Next, a fourth embodiment of the present invention will be described in detail with reference to the drawings.

With reference to FIG. 6, the present embodiment includes a network 41, a private branch exchange 100 connected to the network 41, physically different networks 40 and 42, and back-up devices 101 and 102 and IP terminals 12 and 13 connected to the network 42. The IP terminals 12 and 13 store such registration destination data as shown in FIG. 6. With this structure, when the network 40 or the private branch exchange 100 develops a failure, the IP terminals 12 and 13 go under the control of the back-up device 101 to enter the operation state, while when the back-up device 101 develops a failure, the terminals transmit a terminal operation start request to the further subsequent back-up device 102 to go under the control of the back-up device 102, so that they are allowed to continue operation.

As compared with the above-described Literature 1 and Literature 2, in the above-described embodiments of the present invention, MAC addresses and IP addresses of the main device and the back-up device are completely different. Therefore, when a failure occurs, the back-up device will not replace the main device but operate as a separate device.

As is clear from the foregoing description, in the back-up device for an IP-PBX according to the present invention, with the terminal devices connected to individual networks, the private branch exchange manages and holds the whole of the terminal devices, and the back-up device connected to a further individual network holds the respective terminal data of a group of the terminal devices in the connected network. As a result, when a failure occurs in connection management conducted by the private branch exchange, the back-up device secures connection management in the connected network.

Although the invention has been illustrated and described with respect to exemplary embodiment thereof, it should be understood by those skilled in the art that the foregoing and various other changes, omissions and additions may be made therein and thereto, without departing from the spirit and scope of the present invention. Therefore, the present invention should not be understood as limited to the specific embodiment set out above but to include all possible embodiments which can be embodies within a scope encompassed and equivalents thereof with respect to the feature set out in the appended claims.

The invention claimed is:

1. A private branch exchange back-up system in a network system, comprising:
    a plurality of networks;
    a network for relay which connects said plurality of networks;
    each of the plurality of networks having terminals that communicate with each other through the plurality of networks and the network for relay;
    a private branch exchange which is connected to one of said plurality of networks and which holds terminal data for managing connection between said terminal devices connected to said plurality of networks;
    a back-up device which is connected to a second at least one of said plurality of networks other than the one of said plurality of networks and which holds the terminal data for managing connection between the terminal devices;

wherein when a failure occurs in the operation of connecting the terminal devices by said private branch exchange, said back-up device switches management of connection between the terminal devices to said back-up device in place of said private branch exchange, wherein after switching management of connection between the terminal devices from said private branch exchange to said back-up device, said back-up device transmits state monitoring signals to said private branch exchange to determine whether said private branch exchange is again capable of management of connection between the terminal devices, wherein when said back-up device receives a response to the state monitoring signals indicating that said private branch exchange is again capable of management of connection between the terminal devices, said back-up device automatically switches management of connection between the terminal devices from said back-up device back to said private branch exchange, and wherein said back-up device transmits the state monitoring signal to said private branch exchange at predetermined time intervals before and after switching management of connection between the terminal devices from said private branch exchange to said back-up device.

2. The private branch exchange back-up system as set forth in claim 1, wherein said back-up device inquires of said private branch exchange about terminal data at predetermined time intervals set in advance to download said terminal data.

3. A failure coping method of a network system that has a plurality of networks connected to each other by a relay by another network, where each of the plurality of networks has terminals that communicate with each other through the plurality of networks and the relay network, where one of the plurality of networks has a private branch exchange connected thereto for connecting the terminals to each other, the method comprising the steps of:

connecting a back-up device for said private branch exchange to a second of said plurality of networks other than the one of the plurality of networks; downloading terminal data for managing connection between the terminals from said private branch exchange to said back-up device;

when a failure occurs in the operation of connecting the terminals by said private branch exchange, switching management of connection between the terminals to said back-up device in place of said private branch exchange;

after switching management of connection between the terminals from said private branch exchange to said back-up device, transmitting state monitoring signals from said back-up device to said private branch exchange to determine whether said private branch exchange is again capable of management of connection between the terminals;

and when said back-up device receives a response to the state monitoring signals indicating that said private branch exchange is again capable of management of connection between the terminals, automatically switching management of connection between the terminals from said back-up device back to said private branch exchange, and transmitting the state monitoring signal from said back-up device to said private branch exchange at predetermined time intervals before and after switching management of connection between the terminals from said private branch exchange to said back-up device.

* * * * *